United States Patent [19]

Claunch et al.

[11] Patent Number: 4,488,933
[45] Date of Patent: Dec. 18, 1984

[54] SMALL SOLVENT RECOVERY UNIT

[75] Inventors: Charles K. Claunch; David Bowes, both of Erie, Pa.

[73] Assignee: Finish Engineering Company, Inc., Erie, Pa.

[21] Appl. No.: 412,223

[22] Filed: Aug. 27, 1982

[51] Int. Cl.³ .................................................. B01D 3/02
[52] U.S. Cl. ...................................... 202/83; 202/163; 202/176; 202/235; 203/100
[58] Field of Search ................. 202/83, 163, 164, 166, 202/167, 176, 177, 232, 233, 234, 235, 267 R; 203/100, DIG. 11, DIG. 17, DIG. 24

[56] References Cited

U.S. PATENT DOCUMENTS

| | | | |
|---|---|---|---|
| 3,127,300 | 3/1964 | Maggio | 159/32 |
| 4,081,333 | 3/1978 | Holmes et al. | 203/100 |
| 4,323,429 | 4/1982 | Hoover | 202/83 |
| 4,342,623 | 8/1982 | Loeffler | 202/83 |

Primary Examiner—Frank Sever
Attorney, Agent, or Firm—Webb, Burden, Robinson & Webb

[57] ABSTRACT

Disclosed herein is a process and apparatus for safely distilling relatively small batches of organic compounds such as paint solvents by directly and safely heating the compounds in a vessel having a relatively thick bottom with electrical heating units cast in it and a relatively thick side wall integrally attached to the bottom. The side wall may be integrally attached to the bottom by a weld that penetrates the joint between the side wall and bottom preferably by 100% in order to provide a complete heat transfer from the bottom to the side wall. The vessel is so designed so as to provide a relatively uniform temperature throughout the inner periphery of the vessel thereby avoiding hot spots and insuring that the hottest spot of the inner periphery of the vessel does not exceed the auto ignition temperature of the compound being processed. The process utilizes the thermal conductivity and thickness of the bottom and side wall of the vessel to avoid hot spots and to increase the area for heat transfer from the vessel to the organic compound being distilled. The vessel may be sealed and a vacuum provided in the vessel to enhance the evaporation. The vessel may be provided with a bag inside to remove residual material.

16 Claims, 7 Drawing Figures

SMALL SOLVENT RECOVERY UNIT

REFERENCE TO PRIOR ART

Stills in general are well known to the art and examples of vaporizing reservoirs and collecting chambers are shown in the following patents.

U.S. Pat. No. 4,269,663,
U.S. Pat. No. 4,135,984,
U.S. Pat. No. 4,052,267,
U.S. Pat. No. 3,635,799,
U.S. Pat. No. 3,672,959.

These patents show stills that have various features but none of them have the novel features of the still shown herein.

None of the stills show a boiling chamber having a thick bottom with heating units cast in it and a relatively thick side wall welded to the bottom.

BACKGROUND OF INVENTION

The distillation of solvents has become very important due to the increasing cost of solvents and the problems of disposing of hazardous wastes. Distillation technology has been used for some time but never designed safely for the small application. The basic reason such units were not available for small usages was that all available designs were far too costly and unsafe when made in small units. Underwriter's Laboratories (UL), in their book #UL823 entitled *Electric Heaters for Use in Hazardous Locations*, states on page 16, "The maximum acceptable temperature for the external surface of the heater for Class 1, Group D shall be 365° F." This is by far the most important safety design aspect of the small still revealed herein. The very thick cast bottom of this vessel and the cast-in thermowells with redundant temperature controllers prevent the temperature from exceeding 365° F. at any point on the inner surface.

Materials to be distilled frequently involve organic compounds which may be explosive. One criteria to carry out the process of the present invention is to prevent the temperature at any point on the inside periphery of the boiling vessel from exceeding the auto ignition temperature of the compound even during maloperation and thus result in explosion of such organics; the hottest spot to which the liquid is exposed must be below the auto ignition temperature of the material being distilled. For example, the auto ignition temperature of Heptane is 450° F. Underwriter's Laboratories states that for most common organic solvents, the lowest auto ignition temperature is 365° F. Thus for the practical case of common organic solvents, the lowest auto ignition temperature is 365° F. As stated for safe operation the temperature of the hottest spot with no exceptions must be below the auto ignition temperature of the compound being distilled even in serious maloperation.

GENERAL DESCRIPTION OF INVENTION

A small batch distillation unit and process is disclosed. The process is very special in that it uses a unique conductivity heat transfer vessel in order to render it absolutely safe. Basically, the distillation unit in which the process is carried out has a boiling chamber with a thick bottom and relatively thick wall which allow the energy to be directly and safely trasferred to the materials being distilled. To transfer energy fast enough to be practical, a thick and highly conductive metal is used. In the preferred mode of the invention aluminum was used to make the boiling chamber with a 1½ inch thick bottom with heating element cast in it and ½ inch thick wall with a full penetration weld between the side wall and bottom so that heat conductivity from bottom to side wall is undisturbed. Heat is transferred to the liquid from both bottom and side wall, a relatively large heat transfer area.

It has been noted that when certain materials are distilled a residue coats the bottom of the vessel and insulates the heat source from the material being distilled. By introducing heat from the side wall as in Applicant's thick walled boiling chamber the deposits formed on the bottom have far less effect on the process.

The vapors from the solvent being distilled pass from the boiling chamber through a water cooled heat exchanger, are condensed to a liquid, and fall into a receiving drum. The lid covers the boiling vessel; after a heat-up period, the vapors from the boiling chamber pass through the shell and tube heat exchanger, are condensed into a liquid and fall into a standard drum having for example 15 gallon capacity. This drum and all external vessels must be properly grounded. The gist of the process is that the 15 gallon contaminated solvents are added and about 6–8 hours later, the solvents separated from the contamination are collected in very pure form in the drum.

The process disclosed utilizes the conductivity and thickness of the metal boiling vessel to do the following: (a) to avoid hot spots, by having only a uniform surface temperature and (b) to concurrently greatly increase the effective area of heat transfer from the area immediately adjacent the elements. The electric heater according to the present invention is cast into the metal making up the boiling chamber. The metal is of appropriately high conductivity. The metal is made thick enough relative to its surface conductivity to insure that there are absolutely no surface hot spots. Prior techniques which used bayonet-type heaters could cause disastrous explosions while the still disclosed herein is explosion proof in terms of the art, as specified by the U.S. National Electric Code.

In the following example the maximum temperature variation of the inner periphery of the boiling chamber was plus or minus 5° F. In tests, some 24 different locations on the inside surface of the boiling chamber of the design disclosed were checked for temperature variation. The maximum variation was found to be 3.5° F. in the most severe case.

The tests were made on three drums of polyester/fiberglass contaminated solvents directly obtained from the operations of a manufacturing company (150 gallons divided into 10 batches in a 15 gallon still). The materials were provided by companies who produce fiberglass boats, vessels and housings very typical in their industry. The contaminated solvents came mainly from cleaning of hand tools used in de-airing fiberglass/resin materials and also from rinsing the spray guns used to spray resins. The results of the testing of Applicant's small still were excellent and somewhat startling. Chunks of chopped and unchopped fiberglass, resin solids, unknown solids, paint brushes, nuts, bolts, and in one case a coffee cup were contained in the resins tested. The results of the tests were that 15 gallons of this difficult, contaminated feed solution resulted in approximately 14 gallons of clean, clear solvent for re-use. The residue was a near rock-like solid material (fiberglass, polyester, etc.) and was essentially nontoxic. Thus, the residue could go directly into the trash; and was analogous to throwing away a fiberglass product. Thus, the hazardous waste problem (EPA, landfill, liability, etc. problems) was avoided by the use of this small still distillation process.

The following is an approximate temperature profile of the bottom of the boiling chamber disclosed herein. The boiling chamber contained a conventional heating unit having a wire enclosed in ceramic insulation inside a tube shield cast in the bottom:

Heating Element Wire approximately 1,200° F.
Ceramic shield around wire about 1,200°–600° F.
Tube shield around ceramic insulation about 600°–400° F.
The thermostat is set at 350° F., significantly away from the never-to-be exceeded 365° F.
Temperature of metal of bottom of the boiling chamber about 1/32 of an inch from the heating element—400°–351° F.

All the rest of the material of the boiling container throughout the side wall of the boiling chamber and bottom was 351°–350° F., i.e. plus or minus 0.5° F.

This process is usable in many industries. The two largest classifications are wash-up solvents relative to coatings (paint, ink, dyes, adhesives) and certain degreasing in the metal cutting industry.

Because of the high cost of solvents related to the crude oil price increase in recent years and because of the very high cost of disposal of contaminated solvents due to EPA and new regulations, the economics of the small still are extremely good.

OBJECTS OF THE INVENTION

It is an object of the invention to provide an improved distilling device.

Another object is to provide an improved distilling process.

Another object is to provide an improved process of making a still.

Another object of the invention is to provide a small size distilling device that is simple in construction, economical to manufacture and simple and efficient to use.

Another object of the invention is to provide an improved distilling device with an improved boiling chamber.

Another object of the invention is to provide the distilling device with a bottom and side wall having thickness sufficient to conduct heat generated in the bottom up through the side wall and to the material in the boiling chamber above the bottom and maintain a relatively constant predetermined temperature over the interior wall and bottom.

With the above and other objects in view, the present invention consists of the combination and arrangement of parts hereinafter more fully described, illustrated in the accompanying drawing and more particularly point out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
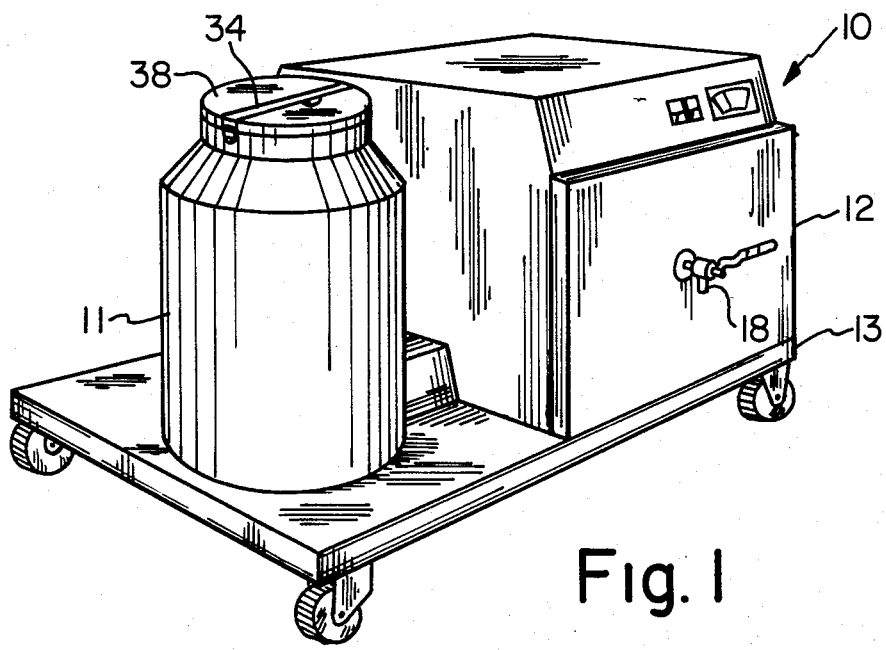
FIG. 1 is an isometric view of the still according to the invention.
Figure 2:
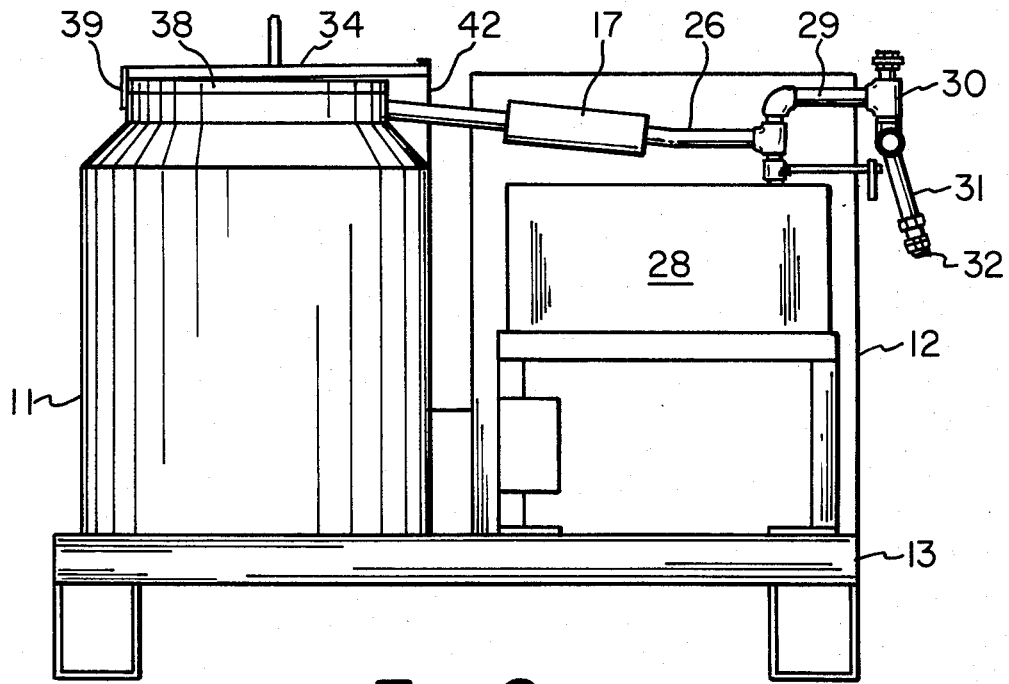
FIG. 2 is a side view of the still shown in FIG. 1.
Figure 3:
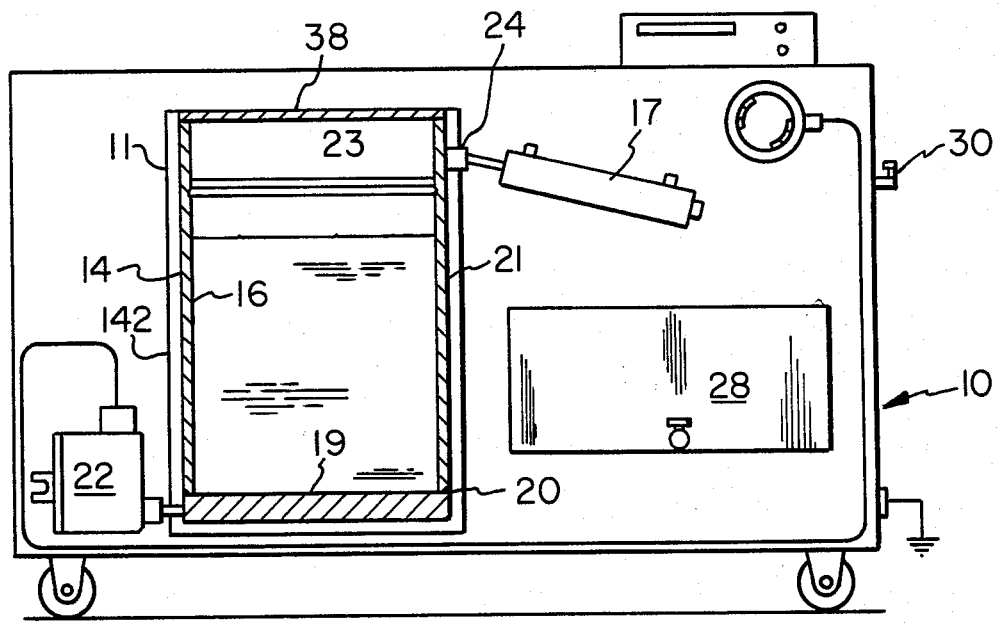
FIG. 3 is a longitudinal cross sectional view of the still and solvent chamber.

Now with more particular reference to the drawings a distilling device is shown generally at 10. It is made up of an evaporation member 11 and a storage chamber 12 supported on a platform 13 as shown. The platform may have supporting wheels as shown in FIG. 1 or it could be supported on legs as shown in FIG. 2. The boiling chamber 14 is in the form of an upright cylinder with a thick bottom 19 and a relatively thick side wall that is welded to the bottom at 20 by a weld that penetrates the joint between bottom and side 100% of the side's thickness providing a substantially integral connection and a good high efficiency heat transfer joint. The side wall 21 is approximately one-third the thickness of the bottom 19 which contains the heating element 15 and the heating element comprises the sole source of heat for both the bottom and the side wall and the thicknesses of the bottom 19 and side wall are determined by the electrical power supplied to the heating element 15 which is cast in the bottom. Thermal insulation 142 of a suitable kind is placed around the boiling chamber.

The tank bottom could be of any thickness so long as it is sufficiently thick to carry a substantial amount of the heat to be transmitted by thermal conductivity of the aluminum material from which the tank is made to the material to be distilled and to limit the temperature of the bottom. In the example shown the tank was approximately 15 inches in diameter and twenty-eight inches deep.

The bag 16 is substantially the same size as the inside of the boiling chamber and the bag rests against the inside surface of the boiling chamber. This still may be used either with or without the bag which is usually nylon. Electric power is turned on to the resistance heater 15 through the control box 22. Electricity will flow through the resistance heater 15 and heat the bottom 19 and this heat will be transferred by thermal conduction through the weld 20 at the bottom of the boiling chamber to the side wall 21 and thence into the liquid if no bag 16 is used or through the bag 16 to the liquid if the bag is used. The bag is for many applications a high temperature nylon bag which is the same type nylon intended for use for cooking purposes in a domestic kitchen.

In operation the bag is filled with a contaminated material to be distilled or if no bag is used contaminated material is placed directly in the boiling chamber. For example, contaminated paint solvent that has been used for washing paint masks may be distilled. Ring 23 secures the upper end of bag 16 in the boiling chamber so it will fall.

The still may be used without the tank 28 by using an external tank instead or storage tank 28 may be used as shown. The tank may be located in the storage chamber 12 or outside the storage chamber and may have a suitable volume depending on the production rate of the machine. The condensate from the condenser 17 may be drained directly through lines 26, 29 and 31; valves 27 and 30 to an external storage tank or to an internal storage tank 28 from which it may be discharged by valve 18.

Figures 4, 6, 7:
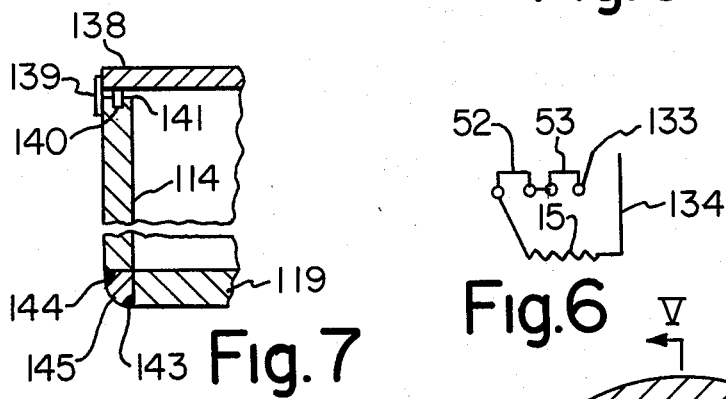
FIG. 4 is a bottom view of the boiling chamber.
FIG. 6 is a partial schematic electrical diagram.
FIG. 7 is an enlarged partial cross sectional view of the seals between the side wall and top and bottom of the container of another embodiment of the boiling chamber.
Figure 5:
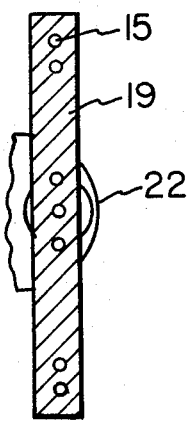
FIG. 5 is a longitudinal cross sectional view taken along line 5—5 of FIG. 4.

The electrical layout of the heating element in the bottom of the boiling chamber is indicated in FIG. 4. A circular section 130 and two semi-circular sections 131 and 132 of the heating element indicated are provided which evenly distribute the heat in the bottom of the boiling chamber. The heating element is cast in the bottom. The circular sections of the heating element have a radius of curvature slightly less than the radius of the bottom and rest concentrically therein. The ends of the circular section 130 are bent back on themselves at 35 and 36 about a large radius where they join the semi-circular sections 131 and 132. The sections 131 and 132 are connected to the diametrically disposed sections 133 and 134 which are connected to the terminals in the terminal box 22 to which a source of electrical current can be connected. The bottom also contains suitable theremostats to protect the apparatus. The heating unit is designed so that the heat developed by it will be carried to the side wall at a rate that will maintain the bottom and wall at a temperature below a predetermined temperature for example 365° F.

Two thermostat sensing elements 50 and 51 are cast in the bottom and connected to two thermostat contact members 52 and 53 connected in series with the heating elements through lines 54 and 55. These thermostat elements may be set in a conventional manner to the desired temperature of something less than 350° F.

The cover 38 is supported on the top of the boiling chamber. The cover is held down by means of a lever 34 which is pivoted to the chamber and is held down by a latch 42. To open the chamber, the latch 42 is unhooked from the lever 34 and the lever 34 may be swung upward out of the way to allow the cover 38 to be removed from the container.

FIG. 7 shows an enlarged partial view of the seals between the side wall and the top and bottom of the container of another embodiment of the invention. The wall 114 has a circular groove around the upper edge of the tank which receives the sealing ring 140. Sealing ring 140 is made of suitable resilient material and extends above the upper end of the wall and engages the cover 138 forming a seal. A pressure sensitive tape 139 is attached to the top 138 and side wall 114 and forms a partial seal which supplements seal 141 which is critically important for vacuum operation. An aspirator pump or other type of vacuum pump may be attached to the consenser at 24. The lower edge 144 of the wall 114 is disposed flush with the top surface of bottom 119. Weld metal 145 completely fills the space adjacent the lower end of the side wall 114 and the outer peripheral edge 143 of the bottom 119. This provides a far more economical method of making the boiling chamber.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A device requiring no external fluid heat transfer medium for reclaiming solvent containing contaminants comprising, means including a boiling chamber designed, dimensioned and arranged for safely and efficiently transferring heat to a liquid organic solvent with a high contaminants loading as residue of solid contaminants settles, said boiling chamber having a thick bottom and a thick side wall integrally connected to said bottom and made of a material of high thermal conductivity and an electrical heating element cast in said bottom, said bottom being sufficiently thick such that the heating element is completely embedded therein, said heating element having a circular portion positioned such that heat from said heating element is conducted through said bottom and up through the side wall of said boiling chamber to a level above the settled residue to solvent in said chamber yet to be evaporated, a closure for said chamber and a condenser connected to said chamber, said condenser having an outlet adapted to discharge into a container for condensate.

2. The device recited in claim 1 wherein said side wall is connected to said bottom by a 100% penetration weld whereby said wall is integrally connected to said bottom.

3. The device recited in claim 1 wherein said boiling chamber is made of aluminum thereby providing said high thermal conductivity through said bottom and wall.

4. The device recited in claim 1 wherein said heating means comprises heating elements cast in said bottom and disposed in the form of a circular section and two generally semi-circular sections concentric with said circular section whereby the heat from said heating element is generally evenly distributed throughout said bottom for conduction through said side wall.

5. The device recited in claim 1 wherein said bottom of said boiling chamber and said side wall is of a thickness so related to the heating capacity of said heating element that the inside surfaces of said side wall and said bottom are limited to a temperature below a predetermined value.

6. In a still device requiring no external fluid heat transfer medium for reclaiming solvents containing contaminants comprising means including a boiling chamber designed, dimensioned and arranged for safely and efficiently transferring heat to a liquid organic solvent with a high contaminants loading as residue of solid contaminants settles, said boiling chamber comprising a disk-shaped bottom being a casting and a cylindrical side wall rising from said bottom, said bottom and side wall being of materials to high conductivity, a heating element comprising an electrically conductive heating wire enclosed in an insulating ceramic shield embedded in said bottom, said bottom and side wall being connected in a manner to provide excellent thermal conductivity therebetween, and said side wall having a thickness of at least about one-third the thickness of the disk-shaped bottom such that heat from said heating element is conducted through said bottom and up through the side wall of the boiling chamber to solvent in said chamber yet to be evaporated, a closure for said chamber, and a condenser connected to said container.

7. The still device according to claim 6 wherein the disk-shaped bottom has a substantially uniform thickness.

8. The still device according to claim 6 wherein said side wall is connected to said bottom by a 100% penetration weld.

9. A still acccording to claims 6, 7, or 8 wherein said bottom and side wall are made of aluminum.

10. A still according to claim 6 wherein said heating element embedded in said bottom has circular sections having a radius slightly less than the radius of the disk-shaped bottom and arranged concentrically therein.

11. The still device according to claim 6 wherein said heating element comprises a circular section and two generally semi-circular sections concentric with said circular section and said circular and semi-circular sections being positioned near the periphery of said disk-shaped bottom.

12. A still according to claim 6 wherein said bottom and side wall are of a thickness so related to the heating capacity of the heating element that the inside surfaces of said side wall and bottom are limited to a temperature below a predetermined value.

13. In a still device requiring no external fluid heat transfer medium for reclaiming solvents containing contaminants comprising means including a boiling chamber designed, dimensioned and arranged for safely and efficiently transferring heat to a liquid organic solvent with a high contaminants loading as residue of solid contaminants settles, said boiling chamber comprising a disk-shaped bottom being a casting of substantially uniform thickness of an aluminum material and a cylindrical side wall rising from said bottom, also being of an aluminum material, a heating element comprising an electrically conductive heating element wire enclosed in an insulating ceramic shield embedded in said bottom, said heating element having a circular configuration with a radius somewhat less than the radius of the disk, said bottom and side wall being connected in a manner to provide excellent thermal conductivity therebetween and said side wall having a thickness of at least about one-third the thickness of the disk-shaped bottom such that heat from said heating element is conducted through said bottom and up through the side wall of the boiling chamber to solvent in said chamber yet to be evaporated, a closure for said chamber, and a condenser connected to said container.

14. The still device acccording to claim 13 wherein said side wall is connected to said bottom by a 100% penetration weld.

15. The still according to claim 13 wherein said heating element comprises a circular section and two generally semi-circular sections concentric with said circular section and said circular and semi-circular sections being positioned near the periphery of said disk-shaped bottom.

16. The still according to claim 13 wherein said bottom and side wall are of a thickness so related to the heating capacity of the heating element that the side surfaces of said side wall and bottom are limited to a temperature below a predetermined value.

* * * * *

UNITED STATES PATENT AND TRADEMARK OFFICE
CERTIFICATE OF CORRECTION

PATENT NO. : 4,488,933
DATED      : December 18, 1984
INVENTOR(S) : Charles K. Claunch et al.

It is certified that error appears in the above-identified patent and that said Letters Patent is hereby corrected as shown below:

Column 1 Line 65 "trasferred" should read --transferred--.

Column 3 Line 58 "point" should read --pointed--.

Column 5 Line 23 "theremostats" should read --thermostats--.

Column 5 Line 54 "consenser" should read --condenser--.

Claim 6 - Column 6 Line 57 "to" should read --of--.

Claim 6 - Column 7 Line 2 "container" should read --chamber--.

Claim 13 - Column 8 Line 20 "container" should read --chamber--.

Signed and Sealed this

Eighth Day of October 1985

[SEAL]

Attest:

DONALD J. QUIGG

Attesting Officer

Commissioner of Patents and
Trademarks—Designate